United States Patent
Hurgobin et al.

(10) Patent No.: US 9,018,120 B2
(45) Date of Patent: Apr. 28, 2015

(54) METHOD FOR PRODUCING METAL-DOPED ZEOLITES AND USE THEREOF FOR THE CATALYTIC CONVERSION OF NITROGEN OXIDES

(75) Inventors: Soovi Hurgobin, Richards Bay (ZA); Arno Tissler, Tegernheim (DE); Ashveer Raghunandan, Kawa Zulu Natal (ZA); Attila Jambor, Prien (DE); Rainer Rakoczy, Rosenheim (DE); Roderik Althoff, Rosenheim (DE)

(73) Assignee: Süd-Chemie IP GmbH & Co KG, Munich (DE)

( * ) Notice: Subject to any disclaimer, the term of this patent is extended or adjusted under 35 U.S.C. 154(b) by 1298 days.

(21) Appl. No.: 12/374,446

(22) PCT Filed: Jul. 19, 2007

(86) PCT No.: PCT/EP2007/006442
§ 371 (c)(1), (2), (4) Date: Dec. 2, 2009

(87) PCT Pub. No.: WO2008/009453
PCT Pub. Date: Jan. 24, 2008

(65) Prior Publication Data
US 2010/0075834 A1 Mar. 25, 2010

(30) Foreign Application Priority Data
Jul. 19, 2006 (DE) .......................... 10 2006 033 452

(51) Int. Cl.
| | | |
|---|---|---|
| B01J 29/06 | (2006.01) | |
| B01D 53/86 | (2006.01) | |
| B01J 29/072 | (2006.01) | |
| B01J 29/76 | (2006.01) | |
| B01J 37/00 | (2006.01) | |
| B01J 37/04 | (2006.01) | |
| B01J 37/08 | (2006.01) | |
| B01J 29/10 | (2006.01) | |
| B01J 29/20 | (2006.01) | |
| B01J 29/42 | (2006.01) | |

(52) U.S. Cl.
CPC ........... *B01D 53/8628* (2013.01); *B01J 29/061* (2013.01); *B01J 29/072* (2013.01); *B01J 29/7615* (2013.01); *B01J 37/0036* (2013.01); *B01J 37/04* (2013.01); *B01J 37/088* (2013.01); *B01D 2255/50* (2013.01); *B01D 2257/402* (2013.01); *B01J 29/106* (2013.01); *B01J 29/20* (2013.01); *B01J 29/42* (2013.01); *B01J 2229/18* (2013.01); *B01J 2229/40* (2013.01); *Y02C 20/10* (2013.01)

(58) Field of Classification Search
USPC .................. 502/60, 74, 77, 78, 79, 86, 85
See application file for complete search history.

(56) References Cited

U.S. PATENT DOCUMENTS

| | | |
|---|---|---|
| 5,171,553 A | 12/1992 | Li et al. |
| 5,271,913 A | 12/1993 | Iida et al. |
| 6,514,470 B1 | 2/2003 | Ott et al. |
| 6,632,767 B2 * | 10/2003 | Huo et al. ...................... 502/64 |
| 2002/0119887 A1 * | 8/2002 | Huo et al. ...................... 502/60 |
| 2013/0004398 A1 * | 1/2013 | Grossschmidt et al. ... 423/239.2 |

FOREIGN PATENT DOCUMENTS

EP 0955080 11/1999

OTHER PUBLICATIONS

Rauscher, M., Kescore, K., Mönnig, R., Schwieger, W., Tißler, A., and Turek, T., "Preparation of a highly active Fe-ZSM-5 catalyst through solid state ion exchange for the catalytic decomposition of N2O," Applied Catalysis A: General 184 (1999) 249-256.
M. Rauscher et al.; "Preparation of a highly active Fe-ZSM-5 catalyst through solid-state ion exchange for the catalytic decomposition of N2O"; Applied Catalysis A: General; 1999; pp. 249-256; vol. 184; Elsevier Science B.V.
A.V. Kucherov et al.; "Solid state reactions as a method of introducing transition metal cations into high-silica zeolites"; Russian Chemical Reviews; 1992; pp. 925-943; vol. 61(9).
T. Sowade et al.; "Relations between structure and catalytic activity of Ce—In—ZSM-5 catalyst for the selective reduction of NO by methane. II. Interplay between the CeO2 promoter and different indium sites"; Journal of Catalysis; 2004; pp. 105-115; vol. 225; Elsevier Science B.V.
H.G. Karge et al.; "High-temperature interaction of solid Cu chlorides and Cu oxides in mixtures with H-forms of ZSM-5 and Y zeolites"; J. Chem. Soc. Faraday Trans.; 1992; pp. 1345-1351; vol. 88(9).
G. Kinger et al.; "Comparison of impregnation, liquid- and solid-state ion exchange procedures for the incorporation of nickel in HMFI, HMOR and HBEA: Activity and selectivity in n-nonane hydroconversion"; Microporous and Mesoporous Materials; 2000; pp. 307-317; vol. 39; Elsevier Science B.V.
S. Beran et al.; "Solid-state incorporation of Mn2+ ions in H-ZSM-5 zeolite"; J. Chem. Soc. Faraday Trans.; 1990; pp. 3033-3037; vol. 86(17).

(Continued)

*Primary Examiner* — Elizabeth Wood
(74) *Attorney, Agent, or Firm* — Florek & Endres PLLC

(57) ABSTRACT

The present invention provides a process for the preparation of metal-doped zeolites comprising the steps of
 i) provision of a dry mixture of
  a) a zeolite,
  b) a compound of a catalytically active metal,
 ii) intimate grinding of the mixture,
 iii) heating of the mixture in a reactor,
 iv) cooling to room temperature and obtaining the metal-doped zeolite,
wherein the internal pressure in the reactor during the heating is kept in a pressure range from 0 to −200 millibar.
The invention further relates to the use of a metal-doped zeolite prepared by means of the process according to the invention for the conversion of $NO_x$ and $N_2O$ into harmless products.

13 Claims, No Drawings

(56) References Cited

OTHER PUBLICATIONS

A.V. Kucherov et al.; "Introduction of Cr(V), Mo(V) and V(IV) ions in cationic positions of high-silica zeolites by a solid-state reaction"; Zeolites; Jan. 1987; pp. 38-42; vol. 7; Butterworth & Co., Ltd.

A. Jourdan; International Search Report in PCT/EP07/06442; Jan. 30, 2008; 7 pgs.; EPO; Rijswijk, The Netherlands.

A. Jourdan; Written Opinion of the International Search Authority in PCT/EP07/06442; Jan. 19, 2009; 7 pgs.; EPO; Munich, Germany.

Varga et al.; "ZSM-5 Zeolites Modified by Solid-State Ion-Exchange for NO Decomposition"; Studies in Surface Science and Catalysis: Catalysis by Microporous Materials (Ed. H.K. Beyer et al.); 1995; pp. 665-672; vol. 94.

Karge et al.; "Introduction of Cations Into Zeolites by Solid-State Reaction"; Zeolite Chemistry and Catalysis (Ed. P.A. Jacobs et al.); 1991; pp. 43-64.

Kapteijn et al.; "Kinetic Analysis of the Decomposition of Nitrous Oxide Over ZSM-5 Catalysts"; Journal of Catalysis; 1997; pp. 256-265; vol. 167 (Article No. CA971581).

\* cited by examiner

METHOD FOR PRODUCING METAL-DOPED ZEOLITES AND USE THEREOF FOR THE CATALYTIC CONVERSION OF NITROGEN OXIDES

The present invention relates to a process for the preparation of metal-doped zeolites and their use in the catalytic conversion in particular of nitrogen oxides.

Metal-doped zeolites and their use, in particular in the catalytic conversion of nitrogen oxides for example from waste gases, are known from the state of the art.

These metal-doped zeolites are used in particular either in pure form or as constituents of coatings on catalyst structures for the purification of waste gases.

The metal-doped zeolites are doped with at least one metallic, catalytically active component. The catalytically active metal component is typically a transition or noble metal, in particular a catalytically active metal such as copper, cobalt, iron, rhodium, platinum etc.

Thus U.S. Pat. No. 5,271,913 describes a catalyst for the conversion of nitrogen oxides from waste gases, wherein the nitrogen oxides are converted into nitrogen.

This catalyst is doped for example with cerium or iron, wherein the catalytic activity is also improved in particular by the use of a zeolite with a high silicon dioxide content in which the molar ratio of $SiO_2$ to $Al_2O_3$ is twenty or more.

Processes for doping zeolites with metals, as disclosed in U.S. Pat. No. 5,271,913, include ion exchange processes in aqueous solution, as is also described in U.S. Pat. No. 5,171,553. In the latter document, silicon-rich zeolites with Si:Al ratios of 5 to 50 are used as supports for the active components.

Problems arise during aqueous ion exchange processes primarily when introducing catalytically active components into the zeolites which, like for example iron or vanadium or also copper, can have different stable oxidation states. Usually only one of these oxidation states is a catalytically active species. During an ion exchange in aqueous solution, often the catalytically active species itself is further oxidized until a thermodynamically more stable oxidation state is obtained.

Solid-state synthesis processes are also known as an alternative to ion exchange processes:

The doping of zeolites with iron through solid-state ion exchange is known from "Studies in Surface Chemistry and Catalysis", 1994, pp. 665-669, pp. 43-64 (1991).

Furthermore, the article from "Journal of Catalysis" 167, pp. 256-265 (1997) describes iron, cobalt and copper-doped zeolites which were obtained by solid-state ion exchange. A mixture of in particular the ammonium and/or the H form of the zeolite with a metal salt is prepared by mechanical mixing in a ball mill at room temperature. However, the metal-doped zeolites disclosed there have almost no reactivity when used as catalysts for the conversion of $N_2O$ into nitrogen at temperatures of less than 650 K in the case of cobalt, copper and iron doping. This is disadvantageous in particular for the simultaneous reduction of nitrogen oxides in waste gases from industrial processes, in exhaust gases and in fluidized bed firing, as temperatures lower than 650 K prevail there.

A further disadvantage of the previously known metal-doped zeolites as catalysts is in particular their reduced long-time stability, in particular as regards the steam-and sulphur dioxide-containing environment, in particular in exhaust gases.

These conditions are usually also called "hydrothermal conditions".

It has been known up to now that metallically doped zeolites can give a long-term stability if the metal-doped zeolite is prepared under anaerobic conditions, with the result that the oxidation of $Fe^{2+}$ cations in aqueous medium to form $Fe^{3+}$ and the simultaneous precipitation of iron hydroxides can be delayed for as long as possible.

EP 0 955 080 B1 proposes for this that, in order to increase the long-term stability of metal-doped zeolites, the doping takes place as part of a solid-state ion exchange reaction under protective atmosphere, in particular a reductive protective atmosphere, for example under ammonia or nitrogen, with the result that due to the anaerobic conditions during calcination a relatively long-term-stabile metal-doped zeolite can be obtained as catalyst.

A metal which is preferably used as doping material because of its reduction properties and its sulphur resistance, but also because it is acceptable as regards health, is iron.

However, as already generally stated above, a modification of zeolites specifically with iron does cause problems because in particular iron salts form larger hydration sheaths, which makes difficult or even prevents a migration of the iron species into the zeolite pores.

The process known from EP 0 955 080 B1 leads disadvantageously to non-uniform metal or iron dopings and often, as a result of the high temperatures, to an oxidation of the $Fe^{2+}$ used into inactive $Fe^{3+}$. During the calcination under the high temperatures, as are disclosed in EP 0 955 080 B1, the zeolite lattice can likewise be damaged by the reactive atmosphere from the $NH_3$ and HCl produced.

The object of the present invention was therefore to provide a process which makes possible a uniform doping of zeolites with metals without concomitant damage to the zeolite lattice and also a process-engineering simplification vis-à-vis the processes known from the state of the art.

This object is achieved according to the invention in that the process for the preparation of metal-doped zeolites comprises the following steps:

i) provision of a dry mixture of
   a) a zeolite,
   b) a compound of a catalytically active metal,
ii) intimate grinding of the mixture,
iii) heating of the mixture in a reactor to a defined temperature,
iv) maintenance of the mixture at the defined temperature
v) cooling to room temperature and obtaining the metal-doped zeolite, wherein the internal pressure in the reactor during the heating is kept in a pressure range from 0 to −200 millibar. "Internal pressure" is thus understood here to mean a weak vacuum in the above "negative pressure" range from 0 to −200 millibar. The negative pressure is therefore typically <0 millibar, with the result that there is always a slight vacuum inside the reactor.

Surprisingly it was therefore found that a relatively rapid heating of the reactor at a slight negative pressure produces a metal-doped zeolite which has an increased activity and long-term stability when used as a catalyst. The negative pressure is preferably also maintained throughout the remainder of the calcination process described below.

It was found that a slight negative pressure or vacuum from 0 to −100, preferably from −10 to −50 millibar during the heating and also during the subsequent solid-state reaction (step iv), calcination) is particularly preferred.

Activity increases of 20 to 50% were achieved with metal-doped zeolites prepared according to the process according to the invention when converting nitrogen oxides compared with corresponding metal-doped zeolites which were prepared at normal pressure according to EP 0 955 080 B1.

Surprisingly, the supply of a separate protective atmosphere according to the European patent cited above was like-wise dispensable, without a reduction in the number of catalytically active $Fe^{2+}$ centres being observed.

Calculated as metal oxide, the metal is preferably contained in a quantity of 0.5 to 20 wt.-% relative to the zeolite.

In the calcining furnace, as a result of the splitting-off of gases such as HCl, $NH_3$ and water during the solid-state reaction, an excess pressure is produced in the furnace which is equalized constantly by applying a negative pressure or vacuum in order to arrive at the negative pressure range according to the invention.

The doping of the zeolite preferably takes place in a so-called deep bed, i.e. the zeolite is introduced into a reactor in powder form, wherein the deep bed of the powder usually has a thickness of 5 to 50 cm, preferably 10 to 20 cm.

During the process according to the invention, the internal pressure of the reactor is preferably kept in the range from a weak vacuum of −10 to −150, more preferably −10 to −100, quite particularly preferably −10 to -50 millibar, whereby metal-doped zeolites form which are particularly reactive and have long-term stability.

The catalytically active metal is preferably selected from the group consisting of Cu, Co, Rh, Pd, Ir, Pt, Ru, Fe, Ni, V. The catalytically active metal is used in the form of a salt, e.g. a nitrate, sulphate, sulphite, hydroxide, nitrite, etc. or in the form of a complex compound.

In step i), in preferred developments of the process according to the invention a nitrogen containing compound selected from an ammonium salt, urea, or a urea derivative is added. By "urea derivative" is meant here so-called urea prills or granules (e.g. available from SKW or Jara) which are not present in crystalline form.

Through the optional use of a solid nitrogen containing compound, in particular an ammonium salt or a solid urea or urea derivative, during calcination a nitrous or ammoniacal atmosphere is automatically created which however, as a result of the constantly applied negative pressure, does not have such high concentrations of ammonia that the zeolite lattice is damaged.

In step iii) the mixture is heated to a temperature between 300° C. to 800° C., preferably 400° C. to 600° C. In other words, compared with conventional solid-state processes, relatively mild conditions are used, with the result that thermal damage to the zeolite is likewise avoided.

The heating period during the process according to the invention is 90 min to 5 h unlike the longer heating steps in the process of the state of the art.

The temperature is advantageously maintained for 8 to 20 h, preferably 10 to 16 h, in order that the solid-state reaction ("calcination") between the constituents of the dry mixture proceeds until complete.

The catalytically active metal in the form of its metal compound is added in a quantity of 0.5 to 10 wt.-% relative to the total dry mixture.

Silicon-rich ZSM-5, Y, BETA or mordenite type zeolites which have a ratio of $SiO_2:Al_2O_3$ of >2.5, preferably >10 are preferably used as zeolite.

The zeolites are present wholly or partly in their ammonium form, with the result that ammonia is automatically released during heating.

The metal-doped zeolite obtainable by the process according to the invention is used in particular for the catalytic conversion of $NO_x$ and $N_2O$, in particular in exhaust gases, as it is particularly stable over the long term and is extremely reactive. Naturally it is quite generally suitable for the removal of NOx and $N_2O$, for example from industrial-scale processes, in particular in the preparation of nitric acid and adipic acid.

The invention is described in more detail below with reference to an example which is not to be understood as limiting:

EXAMPLE 1

5 g ammonium zeolite BETA with an $SiO_2/Al_2O_3$ ratio of 40 was mixed in a ball mill with 0.9 g $FeSO_4 * 7 H_2O$ (Merck) (calculated 5 wt.-% $Fe_2O_3$) for one hour at room temperature. A deep bed consisting of the mixture 10 cm high was then placed in a calcining furnace.

The calcining furnace was then heated from room temperature to 500° C. for 90 min. The internal pressure of the furnace was kept at -20 millibar.

The temperature of 500° C. and the negative pressure were maintained for 12 hours and then the calcining furnace was cooled to room temperature and the iron-doped zeolite washed with water and dried.

The powder was then processed with a binder (pseudo boehmite) in customary manner to form shaped catalyst bodies.

EXAMPLE 2

Several catalysts obtained analogously to example 1 were tested during the catalytic reduction of laughing gas with methane as reducing agent. The catalysts were prepared at different negative pressures in the furnace in order to determine the influence of the applied negative pressure.

The comparative tests were carried out at 360° C. and a GHSV of 10,000 $h^{-1}$ and with a $CH_4/N_2O$ ratio of 0.25.

The conversion of $N_2O$ into $N_2$ was measured against the calcining pressure of the active powder.

TABLE 1

| | Calcining pressure or vacuum during the preparation of the catalyst (in mbar) | | | | | |
| --- | --- | --- | --- | --- | --- | --- |
| | +10 | ±0 | −10 | −20 | −50 | −100 |
| $N_2O$ conversion | 60% | 72% | 96% | 97% | 90% | 85% |

As can be seen from Table 1, a pressure optimum of between 0 mbar and −100, particularly preferably −10 to −50 mbar, quite particularly preferably −10 to −20 mbar, is observed during the calcining.

It can furthermore be seen from Table 1 that the conversion of approx. 60% at a pressure of +10 mbar rises to 97% for a catalyst calcined at a negative pressure or vacuum of −20 mbar.

The difference in the intrinsic activity during this catalytic reaction is of a factor of approx. 2, i.e. the quantity of catalyst to be used can be halved when a catalyst prepared by means of the process obtained according to the invention is used compared with one prepared by a conventional process (EP 0 955 080 B1).

The invention claimed is:

1. Process for the preparation of metal-doped zeolites comprising the steps of:
   i) provision of a dry mixture of
      a) a zeolite, and
      b) a compound of a catalytically active metal,
   ii) intimate grinding of the mixture,
   iii) heating of the mixture in a reactor to a defined temperature between 300° C. and 800° C.
   iv) maintenance of the mixture at the defined temperature between 300° C. and 800° C., and
   v) cooling to room temperature and obtaining the metal-doped zeolite, characterized in that the internal pressure in the reactor during the heating is kept in a negative pressure range from below 0 to −200 millibar.

2. Process according to claim 1, characterized in that the internal pressure in the reactor is maintained in a negative pressure range from −10 to −50 millibar.

3. Process according to claim 1, characterized in that the catalytically active metal is selected from the group consisting of Cu, Co, Rh, Pd, Ir, Pt, Ru, Fe, Ni, and V.

4. Process according to claim 1, characterized in that in step i) a nitrogen containing compound selected from the group consisting of an ammonium salt, solid urea, and a solid urea derivative is added.

5. Process according to claim 1, characterized in that the heating period is b 60 min to 5 h.

6. Process according to claim 1, characterized in that the temperature is maintained for 8 to 20 h.

7. Process according to claim 6, characterized in that the catalytically active metal compound is added in a quantity of 0.5 to 10 wt.-% relative to the total dry mixture.

8. Process according to claim 7, characterized in that silicon-rich zeolites with a $SiO_2:Al_2O_3$ ratio of >2.5 are used.

9. Process according to claim 8, characterized in that ZSM-5, Y, BETA or mordenite type zeolites are used.

10. Process according to claim 9, characterized in that the zeolites are present wholly or partly in their ammonium form.

11. Process according to claim 1, characterized in that the temperature is between 400° C. to 600° C.

12. Process according to claim 6, characterized in that the temperature is maintained for 10 to 16 h.

13. Process according to claim 8, characterized in that silicon-rich zeolites with a $SiO_2:Al_2O_3$ ratio of >10 are used.

* * * * *